E. M. FUNK.
AUTO TOP.
APPLICATION FILED AUG. 5, 1915.
1,202,505.
Patented Oct. 24, 1916.
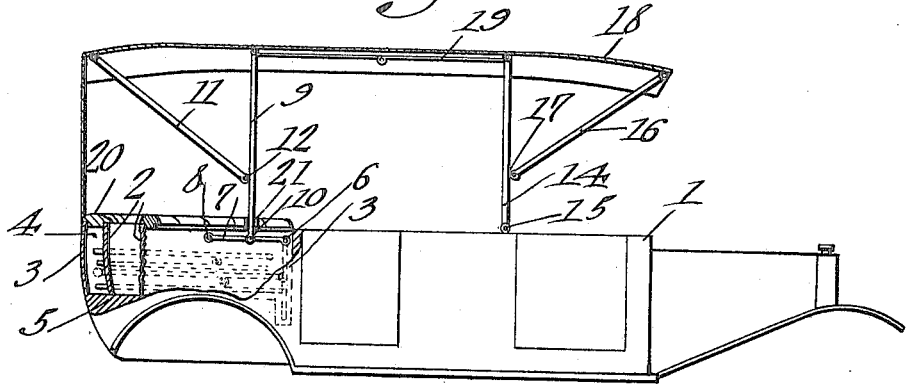
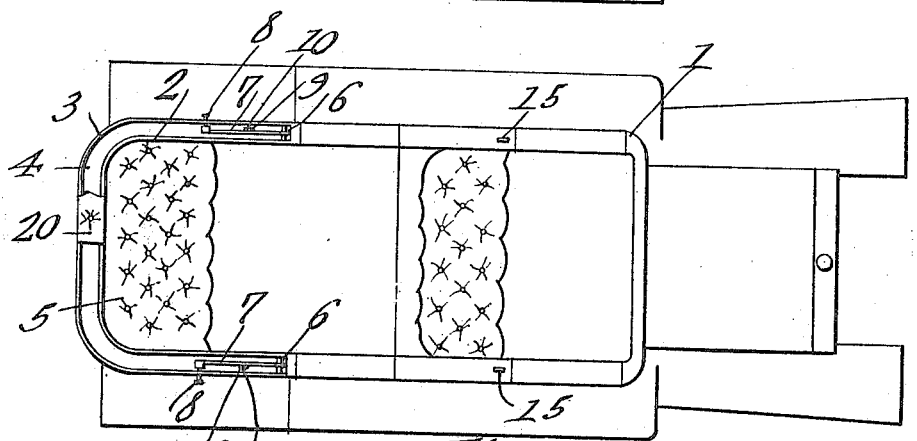
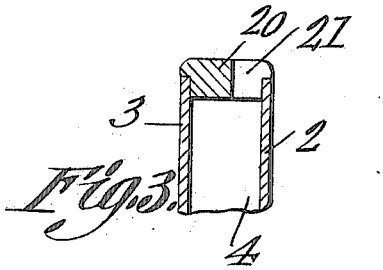
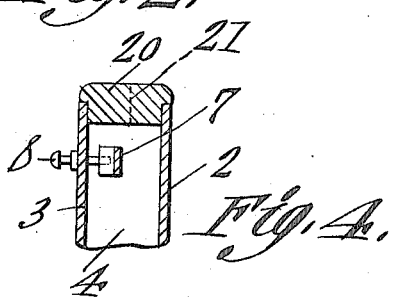
Witnesses
E. M. Funk
Inventor
by
Attorneys

UNITED STATES PATENT OFFICE.

EDGAR M. FUNK, OF SWANTON, VERMONT.

AUTO-TOP.

1,202,505. Specification of Letters Patent. Patented Oct. 24, 1916.

Application filed August 5, 1915. Serial No. 43,833.

*To all whom it may concern:*

Be it known that I, EDGAR M. FUNK, a citizen of the United States, residing at Swanton, in the county of Franklin and State of Vermont, have invented a new and useful Auto-Top, of which the following is a specification.

The device forming the subject matter of this application is a top for an automobile or other vehicle, and the invention aims to provide novel means whereby the bows of the top may be housed in an out-of-the-way position within the contour of the body, when the top is not in use.

Another object of the invention is to provide novel means for supporting and manipulating the bows.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawing:—Figure 1 shows in side elevation, a vehicle wherewith the top forming the subject matter of this application has been assembled, parts being broken away; Fig. 2 is a top plan of the structure shown in Fig. 1, parts being omitted and removed; Fig. 3 is a fragmental cross section taken through the upper edge of the vehicle body; Fig. 4 is a cross section taken through the upper edge of the vehicle body adjacent the latch mechanism.

In the accompanying drawing, the numeral 1 indicates a vehicle embodying an inner wall 2 and an outer wall 3 forming between them an arched recess 4 extended around three sides of a rear seat 5.

Pivoted as indicated at 6 to the body portion of the vehicle and located within the recess 4 at the sides of the vehicle are supports 7 in the form of rods or bars, the rear ends of which are adapted to be engaged by latches 8 of any desired construction mounted in the body portion of the vehicle, the function of the latches 8 being to hold the supports 7 in approximately horizontal positions as clearly shown in Fig. 1 of the drawings. An intermediate bow 9 is pivoted as shown at 10 to the supports 7 between the ends of the supports. A rear bow 11 is detachably pivoted as shown at 12 to the intermediate bow 9. An intermediate bow 14 is detachably pivoted as shown at 15 to the vehicle body. A front bow 16 is detachably pivoted as indicated at 17 to the intermediate bow 14. The bows 9, 16, 14 and 11 support a top 18. If desired a rule-joint brace 19 may connect the bows 14 and 9.

The invention may comprise an arched top cushion 20 adapted to fit between the walls 2 and 3 and provided with notches 21 through which the intermediate bows 9 extend when the top is in the raised condition shown in Fig. 1.

When it is desired to close the top, the cushion 20 is removed, the rear bow 11 is detached from the intermediate bow 9, the front bow 16 is detached from the intermediate bow 14, and the intermediate bow 14 is detached from the vehicle body. The latch 8 may be manipulated, so that the supports 7 may be permitted to swing downwardly into vertical positions. The intermediate bow 9 is swung into a horizontal position within the recess 4, the rear bow 11 lying beneath the bow 9. The bow 14 is superposed on the bow 9, and the bow 16 lies above the bow 14. Subsequently, the cushion 20 is replaced, the entire top being housed within the contour of the vehicle body, and being shielded from view.

Having thus described the invention, what is claimed is:—

In a device of the class described, a vehicle body provided at its rear end with an arched recess; rods located in the recess at the sides of the body; means for pivotally connecting the forward ends of the rods with the body; latch mechanisms carried by the body and engaging the rear ends of the rods to hold the same in substantially horizontal positions; a bow pivotally connected with the rods intermediate the ends of the rods; and a cover carried by the bow; the latch mechanisms being releasable from the rods to permit the rods to swing into substantially vertical positions, thereby to carry the bow and the cover forwardly, and to permit the bow and the cover to enter the recess when the bow and the cover are lowered, the pivotal mounting of the rods serving to reduce the friction incident to the moving of the bow and the cover into and out of the recess.

In testimony that I claim the foregoing as my own, I have hereto affixed my signature in the presence of two witnesses.

EDGAR M. FUNK.

Witnesses:
M. A. HUNGERFORD,
HOMER W. HUNGERFORD.

Copies of this patent may be obtained for five cents each, by addressing the "Commissioner of Patents, Washington, D. C."